US010467616B2

United States Patent
May et al.

(10) Patent No.: US 10,467,616 B2
(45) Date of Patent: *Nov. 5, 2019

(54) VOICE DATA PROCESSOR FOR DISTINGUISHING MULTIPLE VOICE INPUTS

(71) Applicant: PAYPAL, INC., San Jose, CA (US)

(72) Inventors: Ryan Christopher May, Elizabeth Bay (AU); Josh Beyers, San Jose, CA (US); Vidit Maniyar, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/944,144

(22) Filed: Apr. 3, 2018

(65) Prior Publication Data

US 2018/0330358 A1    Nov. 15, 2018

Related U.S. Application Data

(63) Continuation of application No. 15/199,165, filed on Jun. 30, 2016, now Pat. No. 9,934,784.

(51) Int. Cl.
| | |
|---|---|
| *G06Q 20/32* | (2012.01) |
| *G06Q 20/10* | (2012.01) |
| *G06F 21/32* | (2013.01) |
| *G07G 1/00* | (2006.01) |
| *G07G 1/01* | (2006.01) |
| *G06Q 20/20* | (2012.01) |

(52) U.S. Cl.
CPC ......... *G06Q 20/3224* (2013.01); *G06F 21/32* (2013.01); *G06Q 20/102* (2013.01); *G06Q 20/20* (2013.01); *G06Q 20/327* (2013.01); *G06Q 20/3272* (2013.01); *G07G 1/0036* (2013.01); *G07G 1/01* (2013.01)

(58) Field of Classification Search
None
See application file for complete search history.

(56) References Cited

U.S. PATENT DOCUMENTS

| | | |
|---|---|---|
| 5,794,207 A | 8/1998 | Walker et al. |
| 5,893,902 A | 4/1999 | Transue et al. |
| (Continued) | | |

FOREIGN PATENT DOCUMENTS

WO    WO 2012/145354    10/2012

*Primary Examiner* — Fariba Sirjani
(74) *Attorney, Agent, or Firm* — Haynes and Boone, LLP

(57) ABSTRACT

There is provided systems and method for a voice data processor for distinguishing multiple voice inputs. One or more merchant devices may include or be linked to a voice input and output component, where the component may be used to receive voice input and distinguish between multiple voice inputs. The component may activate in a first direction associated with the merchant to detect merchant voice input that establishes a transaction with a user at the merchant's location. The component may activate a merchant device to establish the transaction based on detecting the merchant voice input and/or through voice recognition of the merchant. Once the transaction is established, the component may then activate in a direction of the user, and may request that the user provide voice input to confirm the transaction and engage in transaction processing. The voice input may also confirm and complete a payment to the merchant.

20 Claims, 6 Drawing Sheets

(56) References Cited

U.S. PATENT DOCUMENTS

| | | |
|---|---|---|
| 6,236,972 B1 | 5/2001 | Shkedy |
| 6,535,854 B2 | 3/2003 | Buchner et al. |
| 6,601,762 B2 | 8/2003 | Piotrowski |
| 6,785,367 B2 | 8/2004 | Horvath et al. |
| 7,272,562 B2 | 9/2007 | Olorenshaw et al. |
| 7,334,735 B1 | 2/2008 | Antebi et al. |
| 8,817,964 B2 | 8/2014 | Kim et al. |
| 9,042,564 B2 | 5/2015 | Jang |
| 9,294,476 B1 | 3/2016 | Lurey et al. |
| 2002/0035474 A1 | 3/2002 | Alpdemir |
| 2002/0107816 A1 | 8/2002 | Craig et al. |
| 2003/0191649 A1 | 10/2003 | Stout et al. |
| 2004/0143543 A1 | 7/2004 | Goldman |
| 2006/0166740 A1* | 7/2006 | Sufuentes ............... A63F 13/12 463/40 |
| 2006/0212407 A1 | 9/2006 | Lyon |
| 2007/0240046 A1 | 10/2007 | Yan et al. |
| 2008/0133368 A1 | 6/2008 | Spolar et al. |
| 2008/0140421 A1 | 6/2008 | Marturano et al. |
| 2010/0145971 A1 | 6/2010 | Cheng et al. |
| 2010/0161446 A1 | 6/2010 | Alfred et al. |
| 2010/0217590 A1 | 8/2010 | Nemer et al. |
| 2011/0035294 A1 | 2/2011 | Mizrah |
| 2011/0106701 A1 | 5/2011 | Jagannathan et al. |
| 2012/0316953 A1 | 12/2012 | Ramchandani et al. |
| 2014/0291396 A1 | 10/2014 | Molisimo et al. |
| 2014/0330659 A1 | 11/2014 | Yopp et al. |
| 2014/0344151 A1 | 11/2014 | Soundararajan |
| 2015/0012278 A1 | 1/2015 | Metcalf |
| 2015/0046329 A1 | 2/2015 | Huxham et al. |
| 2015/0081550 A1 | 3/2015 | Priebatsch et al. |
| 2015/0287402 A1 | 10/2015 | Okabe et al. |
| 2015/0363757 A1 | 12/2015 | Mocko et al. |
| 2016/0012430 A1 | 1/2016 | Chandrasekaran et al. |
| 2017/0193480 A1 | 7/2017 | Chandrasekaran et al. |

\* cited by examiner

VOICE DATA PROCESSOR FOR DISTINGUISHING MULTIPLE VOICE INPUTS

CROSS REFERENCED TO RELATED APPLICATIONS

This continuation patent application claims priority to and the benefit of U.S. patent application Ser. No. 15/199,165, filed Jun. 30, 2016, issued on Apr. 3, 2018 as U.S. Pat. No. 9,934,784, the contents of which are incorporated by reference in its entirety.

TECHNICAL FIELD

Example embodiments of the present application relate generally to voice data processing, and more specifically to a voice data processor for distinguishing multiple voice inputs.

BACKGROUND

Merchants may provide the sale of items to users through physical merchant locations. For example, a user may visit a physical merchant location for the merchant where the user may select one or more items for purchase. During checkout and transaction processing for the items selected by the user, the merchant is often required to utilize a merchant device to process a transaction for the items. The merchant device may allow for entry of input by the merchant that establishes and generates the transaction, and further allows for the user to accept a payment instrument and receive payment for the transaction. However, these merchant devices require physical merchant input, for example, through a keyboard or touch screen interface. The merchant device may also require the merchant to physically handle the items, such as through use of a barcode or QR code scanner and/or inspection of the item to find an identifier to enter to the transaction. Thus, where sanitary conditions are required, the merchant may be required to take extra time or utilize clean gloves or other accessories to properly meet handling and sanitary requirements. Such requirements may incur additional costs for the merchant, as well as consuming valuable time. Moreover, even where proper legal standards or industry guidelines are met by the merchant, certain users may feel more comfortable with less merchant physical interaction with purchased items by the user.

Figure 1:
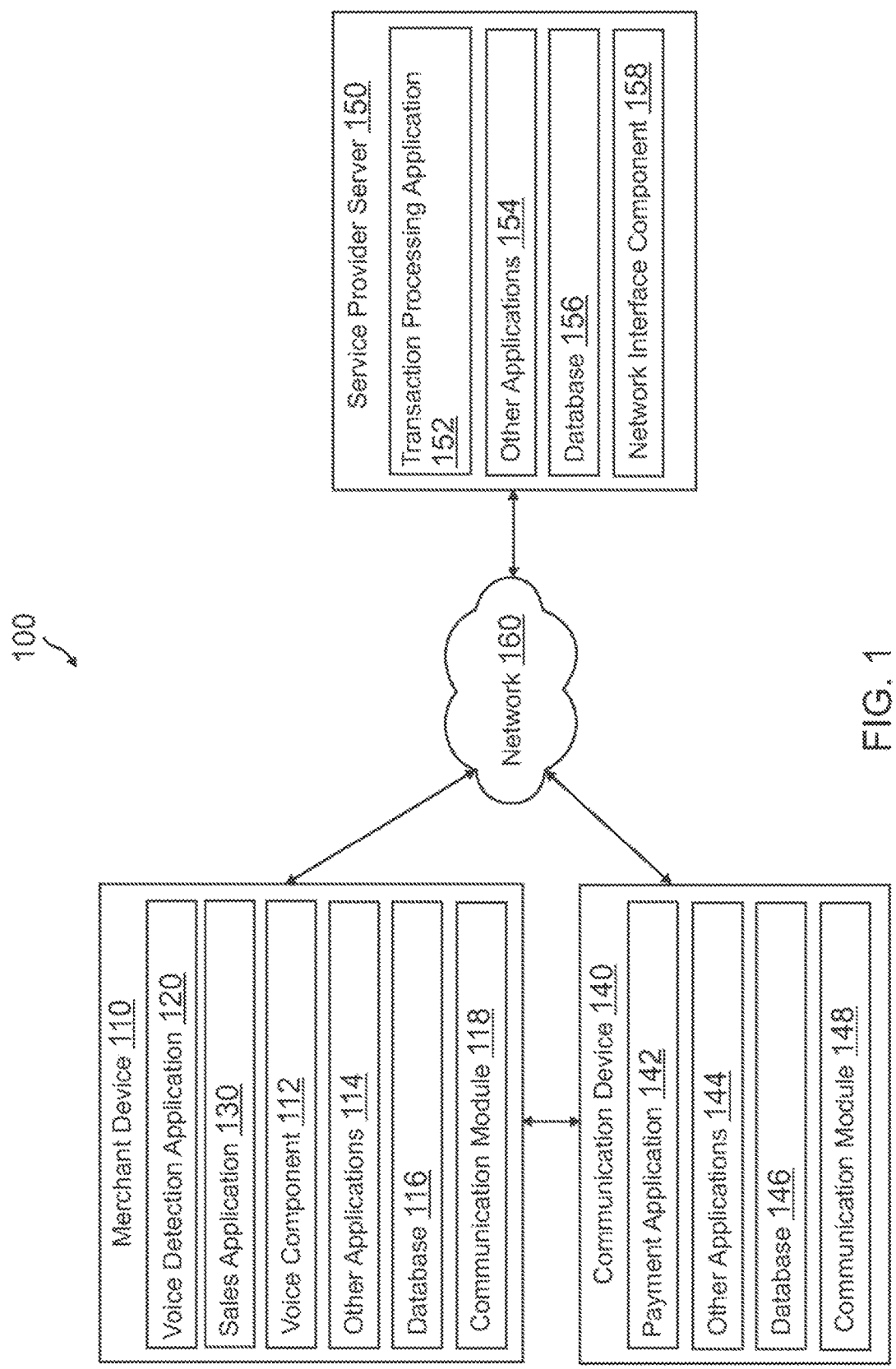
FIG. 1 is a block diagram of a networked system suitable for implementing the process described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for a voice data processor for distinguishing multiple voice inputs. Systems suitable for practicing methods of the present disclosure are also provided.

In various embodiments, a merchant may utilize a voice data processor and/or virtual assistant to establish or otherwise engage in a transaction based on voice input by the merchant and assist a user in submitting and processing an order with the merchant through a merchant device. Merchants (e.g., a seller or payment receiver, including businesses, healthcare providers, or other types of entities that may process transactions with users for purchase of items) may correspond to any person or entity selling goods, products, and/or services (referred to herein as an "item" or "items") to other users/entities, such as buyers (e.g., a payer or payment sender, including a customer, patient, or other party). The merchant may provide sales through a physical merchant location, where one or more users may visit the physical merchant location to select items for purchase. In various embodiments, the merchant may further be required to handle items prior to purchase, for example, in restaurants including fast food locations, coffee shops, sit down restaurants, and other food establishments having health code and sanitation requirements or guidelines. In other embodiments, the merchant may not wish to handle the items, for example, with employees that may be busy or be required to clean their hands prior to scanning an items into a transaction to prevent damage to the item or unclean items and/or item packaging. The merchant may utilize a merchant device, where the merchant device may execute one or more applications for checkout of a transaction (e.g., entry of items into a transaction, calculation of transaction total, and request for a payment instrument) and transaction processing (e.g., processing a payment instrument with a backend payment processor to receive payment from a user through the payment instrument into an account of the merchant). The merchant device may include one or more display and output devices (e.g., output screens and/or speakers), processing units, operating systems, applications, and/or input devices (e.g., keyboard, mouse, microphone, etc.). In various embodiments, the merchant may also utilize online social networking services, where a user may check-in with the merchant and/or identify the merchant in order to provide an identifier to the merchant that identifies the user at the merchant's location, as well as a token of the user for use in transaction processing as described herein. In further embodiments, the merchant may provide for short range wireless communications using the merchant device and/or a wireless device at the merchant location to check-in the user through a communication device (e.g., receive an identifier for the user) and/or receive the token of the user.

In this regard, the merchant may utilize a merchant device, such as a point-of-sale device, checkout terminal, or other transaction processing device, that further includes a voice detection component, such as an audio input component that receives voice input, such as sounds, spoken text/words, or other noise. The voice detection component may correspond to a voice input/output (I/O) component, that further provides output of sound, such as a speaker, as well as other output devices (e.g., visual output devices including LEDs, lights, display screens, etc.). The voice detection component may receive voice input from the merchant and/or a user at the merchant location and initiating or engaged in a transaction with the merchant. In this regard, the voice detection component may receive voice input and provide voice data for the voice input to the merchant device for processing. Thus, the merchant device and the voice detection component may include a voice-to-text application and/or process (e.g., an application linked with a microphone of the voice detection component that executes a voice-to-text processes). The voice-to-text application/process may convert received voice data into text and/or other input to an application or process of the merchant device. For example, voice input by the merchant or by the user/consumer may be converted to text, where the text is entered to a sales and/or transaction processing application for processing of a transaction. In other embodiments, a voice data processing application may instead utilize the voice data as commands to another application or process. For example, key words, such as "item X," "size Y," and/or "cost Z" may all correspond to inputs to another application or process, where the keywords cause entry of input to the application/process. Thus, utilizing a voice data processing application (e.g., voice-to-text or other voice data processor), voice input from a merchant and/or user may be used as input to other applications of the merchant device.

The voice detection component may further include a directional microphone that may detect sound input from one or more specific directions at a time. Thus, the directional microphone may be used to restrict sound input (e.g., voice input) to only receiving the sound input from a direction (e.g., within a specified angle degree, area, or other direction from the directional microphone). The voice detection component and/or merchant device may configure the directional microphone to detect sounds from a direction at a certain time or based on a certain command. For example, the voice detection component may detect sounds from all incoming directions and/or angles, or may be activated based on a command and/or executable process to only detect sound from one or more specific directions at a certain time or based on the command/process. The merchant device may further include at least one display device that may output information to the merchant and/or user. For example, a display device may display transaction information entered to a transaction using voice input to the voice detection component, such as one or more items for purchase in the transaction, a cost of the transaction, and/or a payment instrument for use in the transaction, as well as transaction processing results. The display device may be used to display the transaction information to the user and request the user enter a payment instrument. Thus, in certain embodiments, the merchant device may further include a payment terminal, such as a magnetic card reader, RFID reader, EMV reader, or other type of input device to receive a payment instrument, or may be connected to an existing payment terminal through a wired or wireless connection. Moreover, as previously discussed, the merchant device may include a network and/or short range communication interface to receive a token of the user with a payment provider for payment processing. The display device and/or the voice detection component may include a signaling interface and/or directional indicator, which may indicate a current direction of sound detection of a directional microphone.

Thus, the merchant device may be used to generate and establish a transaction based on voice input of the merchant and/or user. The merchant may therefore utilize the merchant device with the voice detection component to speak or convey sound input, such as merchant voice input, to the merchant device that includes information for a transaction. For example, merchant voice input at a coffee shop may state: "Hello Device X, please ring up Customer Y for a tall dark coffee." The merchant voice input may include a command or other information to initialize an application or process to establish a transaction between the merchant and the user, or the command may instruct the merchant device that an application/process of the merchant device should establish a transaction. For example, the merchant voice input may state: "Please start a transaction," in order to establish a transaction within a sales application/process of the merchant device. The merchant voice input may be detected as belonging to the merchant based on a direction of input and/or detection of the incoming sounds for the merchant voice input, such as through voice recognition techniques. In this regard, prior to establishing a transaction, for example, after finishing another transaction and/or prior to any input to generate another transaction, a directional microphone may be targeted or directed in a direction of the merchant (e.g., towards a merchant checkout area, item preparation area, behind a checkout countertop towards the merchant's direction, etc.). The merchant device may include an indicator on an interface or other output device that indicates a direction that the directional microphone associated with the merchant device is currently detecting. In various embodiments, the merchant voice data may also be detected as belonging to the merchant through voice recognition, for example, in comparison to past or stored voice data, parameters, and/or information for the merchant. Additionally, the merchant device may also associate incoming voice input prior to a transaction as belonging to the merchant and/or a request based on the sequence of entry of the voice input and the data of the voice input. In this regard, the merchant device may assume that initial voice input having commands and/or data to establish a transaction as valid to establish the transaction (even if the voice input comes from the user), which may be deleted on request by the merchant if necessary through an additional command, such as "Delete current transaction."

Once the merchant voice input is received, the merchant device may utilize a voice data processing application or process to determine transaction information for a transaction between the merchant and the user currently checking out with the merchant for the transaction using the merchant voice input. For example, the merchant voice input may be converted to text entered to a transaction in a sales application/process, or may determine commands for input data to the sales application/process. Thus, the merchant voice input may be converted to merchant input data for a transaction, which may include transaction information, such as items in the transaction, a cost of the transaction, a name for the user in the transaction, and/or other information necessary to generate and establish the transaction. Utilizing the established transaction, the merchant device may generate an audio request or audio instruction to the user in the transaction, which may alert the user of the transaction information (e.g., items in the transaction and/or cost of the transaction), as well as request transaction processing instructions from the user (e.g., selection of a payment instrument of the user). For example, a request may state: "Hello Customer Y! Your total is two dollars and fifty cents, how would you like to pay for your tall dark coffee?" The request may also include an upsell to the user, for example, an additional item the user may purchase in the transaction. Thus, the request may further state: "Would you like to add a muffin to you order for $1.50 extra?" Prior to the request, the merchant device may check for available incentives and offer them to the user, which may also include retrieving user information for the user using an identifier or token for the user and/or an account of the user and determining associated benefits for the user based on the user's loyalty status, scanned coupons, etc. The request may also include a request for user feedback for the merchant and/or checkout process, for example, "How was your service with us this morning?" Moreover, in certain embodiments, merchant voice data may not be required, and the merchant device may perform as an "unmanned" or automated device. For example, the merchant device may correspond to an automatic ticket seller, such as a ticketing machine outside an event and/or venue (e.g., a movie theater). In this regard, the merchant device may detect a presence of the user, for example, based on motion detection, weight sensors, and/or user input, and may generate a query to the user. The request may state: "Which movie would you like to see?" or other such output that may cause the user to respond to user input. Thus, the audio request may be in response to detection of the user, and may not require merchant voice data input.

In order to perform transaction processing, the request may further include an audio request for a payment instrument and/or confirmation to utilize a payment instrument, as well as instructions for transaction processing. For example, the request to the user may state: "How would you like to pay?" In such embodiments, the merchant device may allow the user to provide input, for example, through user voice input. Thus, the user may speak commands to the merchant device, which may be used to determine user input to the transaction. The user voice input may select a payment instrument for transaction processing, for example, by stating "I would like to pay with credit card," or similar statement. Thus, the user input to the transaction determined from the user voice input may initiate or execute another process of the merchant device to perform transaction processing. In order to receive the user voice data, the merchant device may receive the user voice data using the voice detection component associated with the merchant device. The merchant device may utilize a directional microphone to receive user voice data from a direction where the user is likely to be located at or nearby. For example, the directional microphone may receive sound input from a direction of the user. An indicator or interface of the merchant device may indicate that the user should provide voice input, or the audio request may instruct the user to provide the voice input. Thus, the directional microphone and/or the indicator/interface may prevent the merchant from providing additional voice input that may be confused with the user voice input. The user voice input may also include additional information to enter to the transaction, such as a tip amount, an agreement to an upsell, an additional item the user wishes to purchase for entry to the transaction, or additional user input.

In other embodiments, the request may state: "Please swipe or enter your payment card below," and highlight or activate a payment card reader terminal. In such embodiments, the user may then enter a payment card to the terminal for transaction processing. In still further embodiments, the merchant device may receive an identifier for the user and/or a token for the user that is associated with a payment account with a payment provider. Such an identifier or other token may be used by the merchant device with the payment provider for transaction processing by providing the token to the payment provider, where the token identifies the user and/or an account of the user and allows for transaction processing using the account of the user. Thus, the token may correspond to an encrypted or unencrypted data package that allows for transaction processing by the payment provider. The token may be received by a check-in of the user with the merchant, for example, through a merchant service and/or social networking service. In other embodiments, the token may be communicated to the merchant device over short range wireless communications with a communication device of the user. The short range wireless communications may correspond to Bluetooth, Bluetooth Low Energy, near field communications, WiFi, LTE Direct, radio, infrared, or other short range communication protocol. The short range wireless communications between the user's communication device and the merchant device may be established automatically or on user request at the merchant location.

Thus, the user may be required to confirm transmission of the token to the merchant device, for example, on arrival at the merchant location and/or during transaction processing. Moreover, the token may only be communicated to the merchant device within a certain proximity of the merchant device so that the token populates during processing of the users transaction. In further embodiments, the token may also include information identifying the user, such as a name of the user. Thus, the token may be matched to a name on the transaction during transaction processing using the data associated with the token. Therefore, when the user's name is spoken by the merchant during generation of the transaction, the correct token for the user may be retrieved. Thus, if the token is associated with the transaction, the merchant device may generate an audio request stating: "Would you like use to charge your account with Payment Provider A?" In other embodiments, the account may automatically be charged, and the merchant device may generate an audio instruction stating: "We are deducting $2.50 from your account with Payment Provider A." In embodiments, where the user has not previously provided the token to the merchant device, the user may utilize the user's communication device to communicate the token to the merchant device in response to the previous statement. Thus, the user may activate a payment application, which may include a process to communicate the user's token to the merchant device over a network or short range connection. In other embodiments, the token may be encoded into an image, such as a barcode or QR code, which may be scanned by a scanner at the merchant device and entered to the transaction for processing. Thus, if the user specifies in response to a query for a payment instrument that they would like to use the payment provider, the user may then communicate the token to the merchant.

Once all data required for output in the request is determined, the request may be generated into sound output data, such as a voice output having the required information and/or statements to be made to the user. The merchant device may then output the request to the user using a speaker associated with the merchant device, for example, where the voice detection component further includes an output device, such as the speaker. The user may provide the corresponding user voice input described above, which may be utilized for transaction processing. Thus, the merchant may interface with a service provider, such as a payment provider, which may provide payment services to one or more users for use with merchants. For example, a payment provider may provide a payment platform to the user and the merchant to provide payments to the merchant, for example, through electronic transaction processing using the payment platform. The payment platform may be maintained by the payment provider, such as PayPal® or other online payment service, which may provide payments and other services on behalf of user, merchants, and other entities. Thus, a sales application executing on the merchant device may provide various functionalities and processes to the merchant to process the transaction, for example, by communicate the transaction information and the payment instrument entered by the user to the payment provider for processing. Additionally, the online payment provider may provide payment accounts and digital wallet services, which may provide accounts to send, store, and receive money, process financial instruments, and/or provide transaction histories. The online payment provider may offer further services, such as extension of credit, credit history review, account establishment and maintenance, and other financial and personal services. After processing of the transaction using the payment instrument, a receipt or transaction history approving or declining the transaction may be communicated to the merchant device. Additionally, the merchant device may be paired to a printer, which may print a receipt to the user. Where the user is later required to pick up goods (e.g., after preparation of food, such as coffee in the above example), the printer may further provide the receipt to the user so that the user may receive their item order. Thus, the merchant may not be required to provide any physical input to the merchant device during transaction processing.

In various embodiments, other users may speak during the transaction providing the user voice data to the voice detection component associated with the merchant device. Similarly, other merchants may also speak during detection of the merchant voice input. In such embodiments, the merchant device may prevent voice input from other users/merchants through one or more of a direction of entry of the voice input, a direction of audio sensitivity for the directional microphone of the voice detection component, a decibel level of the voice input, or voice recognition. Thus, voice input for the other users/merchants may be canceled or ignored from sound input based on one of the aforementioned parameters. Additionally, the merchant may wish to add additional items or change the transaction after the user voice input. Thus, the directional microphone of the voice detection component may again begin receiving sounds from a direction associated with the merchant after receipt of the user voice data. Moreover, an indicator of the merchant device may alert the user that the voice detection component is again detecting sounds and voice input from the merchant so as to prevent the user from attempting to further add voice input.

FIG. 1 is a block diagram of a networked system 100 suitable for implementing the process described herein according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a merchant (not shown), a merchant device 110, a communication device 140, and a service provider server 150 in communication over a network 160. The merchant, with may provide item sales through a physical merchant location, may utilize merchant device 110 to perform hands free transaction processing using voice input to merchant device 110. The voice input may be detected from the merchant, which may be processed to determine transaction information for a transaction between the merchant and a user associated with communication device 140. The transaction information may be entered to a process for transaction processing on merchant device 110. Merchant device 110 may further request that the user provide confirmation of the transaction and initiate transaction processing. The transaction may then be processed using service provider server 150, for example, through a token for an account of the user with service provider server 150, where the token is communicated from communication device 140 to merchant device 110.

Merchant device 110, communication device 140, and service provider server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Merchant device 110 may be implemented using any appropriate hardware and software configured for wired and/or wireless communication with communication device 140 and/or service provider server 150. Merchant device 110 may correspond to a merchant that provides sales through a physical merchant location. In various embodiments, merchant device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, and/or other types of computing devices capable of transmitting and/or receiving data, such as an IPAD® from APPLE®. Although only one merchant device is shown, a plurality of merchant devices may function similarly.

Merchant device 110 of FIG. 1 contains a voice detection application 120, a sales application 130, a voice component 112, other applications 114, a database 116, and a communication module 118. Voice detection application 120, sales application 130, and other applications 114 may correspond to executable processes, procedures, and/or applications with associated hardware. In other embodiments, merchant device 110 may include additional or different software as required.

Voice detection application 120 may correspond to one or more processes to execute modules and associated specialized hardware of merchant device 120 to detect and/or request incoming voice input, as well as convert the voice input to voice data for entry into sales application 130 in certain embodiments. In this regard, online sharing application 120 may correspond to specialized hardware and/or software of merchant device 110 to first detect merchant voice input. Voice detection application 120 may determine that sounds are merchant voice input based on one or more of determining that the sounds differ from ambient sounds detected by voice component 112, a voice recognition process for detecting the merchant's voice in incoming sounds, a directional microphone of voice component 112 that receives incoming sounds from a direction associated with the merchant, and/or based on transaction processing of sales application 130 (e.g., if sales application 130 is currently awaiting input to generate a transaction). Thus, voice detection application 120 may first detect merchant voice input. In various embodiments, voice detection application 120 may utilize a directional indicator, interface, or other visible output display to indicate that a directional microphone of voice component 112 is currently receiving voice input from a specific direction, such as a direction associated with the merchant. For example, voice detection application 120 may be configured by the merchant to point a directional microphone of voice component 112 at a location associated with the merchant (e.g., in a checkout preparation and/or processing location, such as behind a merchant countertop). Voice detection application 120 may then await voice input.

Once merchant voice input is detected, voice detection application 120 may utilize the merchant voice input to provide merchant input to a transaction, for example to establish the transaction and/or provide transaction information in the transaction. Thus, in certain embodiments, voice detection application may utilize a voice-to-text process to determine merchant input from the merchant voice input, for example, by translating verbal commands, words, sentences, and other audio data in the merchant voice input to merchant input to a transaction (e.g., text and other data for entry to sales application 130). Voice detection application 120 may also convert the merchant voice input to merchant input to sales application 130 based on audio commands and sounds performed by the merchant and detected in the merchant voice input. For example, a statement may be configured with voice detection application 120 and/or sales application 130 to execute a process and/or enter an input to a transaction, such as "tall coffee" to select an item identifier for tall coffee to add to a transaction. Voice detection application 120 may also filter out other sounds in the merchant voice input, including background ambient sounds, other users and/or merchants, and other background noises. The background noises may be filters based on an incoming direction of the noises, voice recognition, a decibel level of the noises, or other filtering technique. In other embodiments, sales application 130 may perform the process of converting voice input (e.g., detect sound data from a merchant and/or a user) into data used as input to sales application 130.

After generation and establishment of the transaction using sales application 130 based on the merchant voice input detected by voice detection application 120, voice detection application 120 may further determine information required for processing of the transaction, such as user approval of the transaction, a payment instrument for the user to process the transaction, and/or other required information. In this regard, voice detection application 120 may generate a request for the user associated with communication device 120 to confirm the transaction and enter a payment instrument or accept payment processing through a previously received payment instrument (e.g., a token for an account of the user with service provider server 150). The request may correspond to audio output, such as voice requests and/or commands output through voice component 112. The request may further include instructions to the user, which may instruct the user on actions to perform and/or processes to execute in order to accept the transaction and/or provide a payment instrument. For example, the request may include a statement of the transaction information, a request to approve the transaction using a voice command (e.g., "I accept" or "Yes"), and an instruction to enter a payment instrument to a card reader or by communicating a token from the users device. Where the user's token is already received, the request may instead ask the user to approve transaction processing using the token. Additionally, voice detection application 112 may direct a directional microphone of voice component 112 to detect user voice input from a direction associated with the user. Moreover, an indicator, interface, or other visual cue may further indicate that the directional microphone is now detecting voice input from a direction for the user, for example, a direction the merchant has configured voice detection application 120 to detect user voice input (e.g., in front of a checkout register). In further embodiments, sales application 130 may determine information required by the user to process the transaction between the user and the merchant, which may utilize voice component 112 to output the information as audio requests and/or commands to the user.

In response to outputting the request through voice component 112, voice detection application 120 may detect user voice input from the user. The user voice input may include acceptance or rejection of the transaction, as well as information necessary to process a payment instrument to provide a payment for the transaction. The user voice input may, similarly to the merchant voice input, be converted to user input to the transaction by voice detection application 120 and/or sales application 130. Once the user input is determined, the user input may be entered to the transaction, and sales application 130 may perform transaction processing. Additionally, voice detection application 120 may be used to differentiate the user and/or the merchant from other users/merchants based on one or more voice recognition, direction of voice input, decibel level of voice input, input data determined from the voice input, or other audio processing technique. Thus, other users' voices may be removed from the user voice input based on processing the user voice input. Where necessary, voice detection application 120 may further allow additional merchant voice input after the user voice input. Thus, voice detection application 120 may again direct a directional microphone of voice component 112 towards the merchant, and provide indication of the direction of detection for the directional microphone using an output display device.

Sales application 130 may correspond to one or more processes to execute modules and associated devices of merchant device 110 to provide a convenient interface to permit a merchant for merchant device 110 to enter, view, and/or process items the user wishes to purchase through merchant voice input and user voice input detected by voice detection application 120. In this regard, sales application 130 may correspond to specialized hardware and/or software utilized by merchant device 110 that may provide "hands-free" transaction processing through voice input and corresponding transaction generation and processing using the voice input. Thus, sales application 140 may be implemented as an application having a user interface enabling the merchant to enter and/or view the items a user associated with communication device 140 has selected for purchase (e.g., at a merchant location for the merchant, for example, items brought to a checkout register for the merchant and/or requested to be produced by the merchant). Sales application 130 may further enable the merchant to enter coupons and/or discounts for the items, edit the order including adding, removing, and/or modifying items, or other functions with regards the selected items in the purchase order. Once the items have been arranged into an order for purchase by the user, a total may be calculated and a transaction may be engaged with the user to complete payment for the selected items, for example, through a received payment instrument. Thus, sales application 130 may request payment covering the selected items from the user. Transaction processing to receive a payment may be processed by service provider server 150, which may process a payment instrument for the user to provide payment for the transaction to an account of the user. Sales application 130 may alert the merchant when payment for the transaction for the item(s) is completed and may provide a transaction history to sales application 130 for generate of a receipt to the user associated with communication device 140. Sales application 130 may also be used to communicate information to communication device 140 and/or service provider server 150, such as messages to alert the user of order fulfillment and/or pickup instructions (e.g., where the merchant may produce an item, such as food at a restaurant location). In various embodiments, the processes provided by sales application 130 to provide a receipt and/or order number or other transaction tracker may correspond to a device internal or external to merchant device 110, such as a receipt printout device connected to merchant device 110 that may provide a receipt to a user for order for fulfillment. Thus, the printout device may allow the user to receive a physical receipt without requiring merchant physical interaction with the device and/or receipt.

Sales application 130 may receive merchant voice input, and/or merchant transaction input determined from the merchant voice input, from voice detection application 120. In this regard, sales application 130 may further process merchant voice input to determine transaction data and information, such as merchant input to a transaction, using voice data processing, voice-to-text, or other audio processing, as discussed herein in reference to voice detection application 120. However, in other embodiments, voice detection application 120 may determine the merchant input to a transaction from the merchant voice input. Once the merchant input is determined, sales application 130 may establish a transaction using the merchant input, for example, by entering items into the transaction, associating a name of the customer (e.g., the user associated with communication device 140) to the transaction, or otherwise establishing transaction information. Sales application 130 may determine a total for the transaction, as well as other information necessary for transaction processing (e.g., an order number, wait time, etc.). Sales application 130 may then generate a request for user voice input to confirm the transaction, proceed with transaction processing, and/or enter, select, or confirm use of a payment instrument. However, in other embodiments, voice detection application 120 may generate the request based on transaction information established for the transaction using the merchant input and sales application 130, as discussed herein. For example, voice detection application 120 may utilize a transaction cost or total calculated by sales application 130 when generating the request. Additionally, the request may be generated by voice detection application 120 and/or sales application 130 that includes an upsell for one or more additional items and/or changes to the item(s) in the transaction. The request may allow the user to agree to an upsell, which may update the transaction based on received user voice input, or decline the upsell through user voice input. Sales application 130 may also generate a request that allows the user to enter a tip or other additional amount to a total in the user's response to the request, for example, by instructing the user to state an additional amount the user would like to add to the transaction.

Sales application 130 may also receive user voice input, and/or user input to a transaction determined from the user voice input, from voice detection application 120. In this regard, voice detection application 120 and/or sales application 130 may determine the user input from the user input using voice data processing, voice-to-text, and/or other audio processing technique. Sales application 130 may utilize the user input to process the transaction between the merchant associated with merchant device 110 and the user associated with communication device 140. For example, the user input may confirm that the user has approved transaction processing, and thus sales application 130 may process the transaction to receive payment for the merchant from the user. In this regard, sales application 130 may receive a token that identifies a user account of the user, such as a payment account, with service provider server 150. Sales application 130 may receive the token for the user over short range wireless communications between merchant device 110 and communication device 140. The short range wireless communications may correspond to Bluetooth, Bluetooth Low Energy, near field communications, WiFi, LTE Direct, radio, infrared, or other short range communication protocol. The token may be communicated automatically when communication device 140 is within range for the short range wireless communications with merchant device 110, for example, after connection and pairing of merchant device 110 with communication device 140. In other embodiments, sales application 130 may request the token from communication device 140 over the short range wireless communications, which may occur during transaction processing. In this regard, sales application 130 communicates the request to devices within range of the short range wireless communications, which may include communication device 140. In such embodiments, communication device 140 may then pair with merchant device 110 and provide the token.

Additionally, the token may be received by merchant device 110 on check-in of the user with a merchant location for merchant device 110 using communication device 140. Thus, a service provider may be used to check-in the user to the merchant location, where the check-in provides an identifier for the user and/or the token to sales application 130 for use in transaction processing. Thus, the token may be received prior to transaction generation and/or processing or at the time of transaction processing. The token may be associated with the transaction based on a name of the user in the transaction and user information in the token. For example, the user's token may only be matched to a transaction having an identified user name that corresponds to the user's name and/or account name with service provider server 150. However, in other embodiments, the user may state a payment instrument (e.g., cash, etc.) or may enter a payment instrument to a terminal associated with merchant device 110 (e.g., a credit/debit card terminal, gift card reader, bar/QR code scanner, etc.). Thus, the received payment instrument may include a payment card, payment account, bank account, and/or physical payment instrument. Sales application 130 may process the payment instrument for the amount and may complete payment for the matter associated with the transaction using service provider server 150. Once the payment instrument is entered to the transaction, sales application 130 may utilize the user input to initiate and complete transaction processing, for example, if the user accepts the transaction and processing of the transaction using the payment instrument. Sales application 130 may provide an interface, such as a graphical user interface (GUI) to display the transaction and/or the results of transaction processing. The GUI may further display order information for the order (e.g., an order number) and/or user information (e.g., a user name, image, etc.). Where additional merchant voice input is received after the user voice input, the additional merchant voice input may be processed to determine additional merchant input to the transaction, such as an update to the transaction, revision of the transaction, cancellation of the transaction, or other transaction change.

In various embodiments, one or more features of voice detection application 120 and sales application 130 may be incorporated the same module so as to provide their respective features in one interface, process, or multiple processes.

Voice component 112 may correspond to a device component of merchant device 110, connected device to merchant device 110, and/or standalone device that communications with merchant device 110. In this regard, voice component 112 may correspond to a device configured to detect sounds and receive sound input, including voice input from a user and/or a merchant. Thus, voice component 112 may correspond to a microphone or other audio sensor, which may detect sound waves occurring around voice component 112. Voice component 112 may include multiple audio sensors, as well as direct specific audio sensors, for example, one or more directional microphones that may detect sounds waves and audio patterns for a specific area degree angle from voice component 112, or other specific direction. Voice component 112 may be configurable by voice detection application 120 and/or sales application 130 to utilize the directional audio sensor to detect sound and audio patterns for a specific direction, and may turn on/off, rotate, or otherwise move direction specific components and sensors to pick up sound in the specific direction. Thus, voice component 112 may include mechanical and/or electrical processes to activate a directional microphone for a direction and receive audio input from that direction. In various embodiments, voice component 112 may further include output display devices, such as an interface, one or more lights or LEDs, or other visual indicators that may indicate a current direction of audio reception for the directional microphone(s) of voice component 112. Additionally, voice component 112 may include an audio output device, such as a speaker, which may communicate audio requests and/or instructions determined by voice detection application 120 and/or sales application 130, as discussed herein.

Merchant device 110 includes other applications 114 as may be desired in particular embodiments to provide features to merchant device 110. For example, other applications 114 may include security applications for implementing client-side security features, programmatic client applications for interfacing with appropriate application programming interfaces (APIs) over network 160, or other types of applications. Other applications 114 may also include email, texting, voice and IM applications that allow a merchant to send and receive emails, calls, texts, and other notifications through network 160. In various embodiments, other applications 114 may include financial applications, such as banking, online payments, money transfer, or other applications associated with a payment provider, such as service provider server 150. Other applications 114 may contain software programs, executable by a processor, including a graphical user interface (GUI) configured to provide an interface to the user.

Merchant device 110 may further include database 116 which may include, for example, identifiers such as operating system registry entries, cookies associated with voice detection application 120, sales application 130, and/or other applications 114, identifiers associated with hardware of merchant device 110, or other appropriate identifiers, such as identifiers used for payment/user/device authentication or identification. Identifiers in database 116 may be used by a payment/service provider to associate merchant device 110 with a particular account maintained by the payment/service provider. Database 116 may also further store received audio input, as well as application input data for use with voice detection application 120 and/or sales application 130. Moreover, database 116 may store transactions and transaction information, as well as transaction histories and receipts.

Merchant device 110 includes at least one communication module 118 adapted to communicate with communication device 140 and/or service provider server 150 over network 160. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Communication device 140 may be implemented using any appropriate hardware and software configured for wired and/or wireless communication with merchant device 110 and/or service provider server 150. For example, in one embodiment, communication device 140 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, and/or other types of computing devices capable of transmitting and/or receiving data, such as an IPAD® from APPLE®. Although a merchant device is shown, the merchant device may be managed or controlled by any suitable processing device (e.g., a server and/or cloud computing system). Although only one merchant device is shown, a plurality of merchant devices may be utilized.

Communication device 140 of FIG. 1 contains a payment application 142, other applications 144, a database 146, and a communication module 148. Payment application 142 and other applications 144 may correspond to executable processes, procedures, and/or applications with associated hardware. In other embodiments, communication device 140 may include additional or different software as required.

Payment application 142 may correspond to one or more processes to execute modules and associated devices of communication device 140 to process transaction by the user associated with communication device 140 with a merchant associated with merchant device 110, for example, by providing a token for the user and/or the user's account with service provider server 150 to merchant device 110 for processing. Thus, in various embodiments, payment application 142 may be utilized by the user of communication device 140 to provide an interface to permit the user associated with communication device 140 to select payment options and provide payment for items, for example, to a merchant through merchant device 140 using service provider server 150. Payment application 142 may be implemented with a user interface enabling the user to enter payment options, select and provide payment options on checkout/payment of one or more items with a merchant, and complete a transaction for the item(s) through processing a payment request for the item(s) with service provider server 150. In other embodiments payment application 142 may be used to select payment options (e.g., a payment instrument including a payment account with service provider server 150) for the user, generate or request generation of a token identifying the select payment instrument, and/or communicate the token to merchant device 110, where the token allows for transaction processing of a transaction by merchant device 110 by communicating the token to service provider server 150 to allow service provider server 150 to provide a payment to an account of the merchant using the user's selected payment option. Payment application 142 may also be used to establish a user account, such as a payment account, with service provider server 150 to provide payments through the payment account. Payment application 142 may be used to link the payment account to the token generated for the user and/or the account by receiving the token and utilizing the token during transaction processing.

Moreover, payment application 142 may be used to communicate the token to merchant device 110 using one or more of a check-in of the user at the merchant's location and provision of the token during or after the check-in and/or through short range wireless communications with merchant device 110. In this regard, payment application 142 may be used to perform a check-in with a merchant location, which may utilize an online service provider including service provider server 150 and/or a social networking service. In other embodiments, one or more applications within other application 144 may be used to perform the check-in. Additionally, payment application 142 may be used to communicate with merchant device 110 using short range wireless communications, for example, using Bluetooth, Bluetooth Low Energy, near field communications, WiFi, LTE Direct, radio, infrared, or other short range communication protocol. Thus, communication device 140 may automatically connect with merchant device 110 when communication device 140 is within a proximity distance for the short range wireless communications. In other embodiments, the user of communication device 110 may perform actions with communication device 140 to establish the connection using short range wireless communications. Once a connection is established with merchant device 110, payment application 142 may communicate the token to merchant device 110 for processing.

Thus, payment application 142 may initiate, engage in, and/or receive a transaction, where the transaction includes one or more items for purchase by the user from a merchant. Payment application 142 may be used to process the transaction with service provider server 140 to provide a payment to merchant device 140 for the transaction. In other embodiments, merchant device 110 may perform the processing based on a received payment instrument. The payment request may be processed using a payment account for the user. For example and as discussed herein, service provider server 150 may be used to provide payment to the merchant associated with merchant device 140. Payment application 142 may therefore be used to provide payment information for use in processing the payment. Payment application 142 may utilize user financial information, such as a credit card, bank account, or other financial account, as a payment instrument when providing payment information. Additionally, payment application 142 may utilize a user account with payment provider, such as service provider server 150, as the payment instrument, for example, using the aforementioned token. Payment application 142 may be utilized to view the results of the transaction and/or for viewing and storage of a transaction history, such as a receipt. In various embodiments, payment application 142 may correspond to a general browser application configured to retrieve, present, and communicate information over the Internet (e.g., utilize resources on the Internet) or a private network. In other embodiments, payment application 142 may include a dedicated application of service provider server 140, which may be configured to process transactions through input provided to payment application 142.

Communication device 140 includes other applications 144 as may be desired in particular embodiments to provide features to communication device 140. For example, other applications 144 may include security applications for implementing client-side security features, programmatic client applications for interfacing with appropriate application programming interfaces (APIs) over network 160, or other types of applications. In various embodiments, other applications 144 may include financial applications, such as banking, online payments, money transfer, or other applications associated with service provider server 150. Additionally, other applications 144 may include social networking/media, microblogging, and/or mapping applications, which may be used with payment application 142 to engage in various processes, including check-in processes at a merchant location for a merchant. Other applications 144 may contain other software programs, executable by a processor, including a graphical user interface (GUI) configured to provide an interface to the user.

Communication device 140 may further include database 146 which may include, for example, identifiers such as operating system registry entries, cookies associated with payment application 142, messaging module 120, and/or other applications 144, identifiers associated with hardware of communication device 140, or other appropriate identifiers, such as identifiers used for payment/user/device authentication or identification. In one embodiment, identifiers in database 146 may be used by service provider server 150 to associate communication device 140 with a particular account maintained by service provider server 150. Database 146 may further store transactions and transactions histories for payment application 142. Additionally, a payment token, payment instrument, or other information used in transaction processing may be stored to database 146.

In various embodiments, communication device 140 includes at least one communication module 148 adapted to communicate with merchant device 110 and/or service provider server 150. In various embodiments, communication module 148 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 150 may be maintained, for example, by an online payment service provider, which may provide payment services for users (e.g., consumers) and/or merchants, as well as a voice data processing where merchant device 110 does not include processes and/or applications to process merchant voice data and/or user voice data detected by merchant device 110. In this regard, service provider server 150 includes one or more processing applications, which may provide the aforementioned services, for example, by communicating with merchant device 110 and/or communication device 140. In one example, service provider server 150 may be provided by PAYPAL®, Inc. of San Jose, Calif., USA. However, in other embodiments, service provider server 150 may be maintained by or include a merchant, financial services provider, and/or other service provider, which may provide transaction processing and/or voice data processing services to the user. Service provider server 150 may additionally provide use of accounts for transaction processing and payments.

Service provider server 150 of FIG. 1 includes a transaction processing application 152, other applications 154, a database 156, and a network interface component 158. Transaction processing application 152 and other applications 154 may correspond to executable processes, procedures, and/or applications with associated hardware. In other embodiments, service provider server 150 may include additional or different software as required.

Transaction processing application 152 may correspond to one or more processes to execute software modules and associated specialized hardware of service provider server 150 to provide transaction processing services to users, for example though a payment account and/or payment instruments, which may include payment during transaction processing of a transaction generated and processed based on voice input by a merchant associated with merchant device 110 and a user associated with communication device 140. In this regard, transaction processing application 152 may correspond to specialized hardware and/or software to provide payment services and payment accounts, including digital wallets storing payment instruments. The transaction processing services may allow for a payment by a user to a merchant for a transaction through a payment instrument, including a credit/debit card, banking account, payment account with service provider server 150, and/or other financial instrument. Transaction processing for the transaction may be performed through receipt of a token for the user and/or the user's account from merchant device 140 with transaction information, where the token authenticate the user and allows/approves transaction processing using the account of the user. In this regard, on establishment of the account for the user and/or digital wallet for the user with transaction processing application 152, transaction processing application 152 may generate a token that identifies the account/digital wallet and authenticates the user for transaction processing. The token may then be communicated to communication device 110 for processing.

In order to establish a payment account for a user to send and receive payments, transaction processing application 152 may receive information requesting establishment of the payment account. The information may include user personal and/or financial information. Additionally the information may include a login, account name, password, PIN, or other account creation information. The user may provide a name, address, social security number, or other personal information necessary to establish the account and/or effectuate payments through the account. Transaction processing application 152 may further allow the user to service and maintain the payment account, for example, by adding and removing payment instruments. Transaction processing application 152 may be used to process a transaction between a user and a merchant using the account. In order to perform transaction processing of the transaction and/or payments, transaction processing application 152 may the account of the user and provide the payment to an account of the merchant. Transaction processing application 152 may also be used to provide transaction histories for processed transactions.

In various embodiments, service provider server 150 includes other applications 154 as may be desired in particular embodiments to provide features to service provider server 150. For example, other applications 154 may include security applications for implementing server-side security features, programmatic server applications for interfacing with appropriate application programming interfaces (APIs) over network 160, or other types of applications. Other applications 154 may contain software programs, executable by a processor, including a graphical user interface (GUI), configured to provide an interface to a user.

Additionally, service provider server 150 includes database 156. As previously discussed, the user and a merchant corresponding to merchant device 110 may establish one or more payment accounts with service provider server 150. Payment accounts in database 156 may include user/merchant information, such as name, address, birthdate, payment/funding information, additional user financial information, and/or other desired user data, including user identifiers/tokens for use in identifying the payment account. The user and the merchant may link payment accounts to communication device 140 and/or merchant device 110, respectively, through an identifier. Thus, when the identifier is transmitted to service provider server 150, e.g., from communication device 140 and/or merchant server 120, an account belonging to the user and/or the merchant may be found. In other embodiments, the user and/or the merchant may not have previously established a payment account and other financial instrument or information may be provided. Moreover, database 156 may also store received transaction information and an associated payment instrument, as well as transaction processing results.

In various embodiments, service provider server 150 includes at least one network interface component 158 adapted to communicate with merchant device 110 and/or communication device 140 over network 160. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2A:
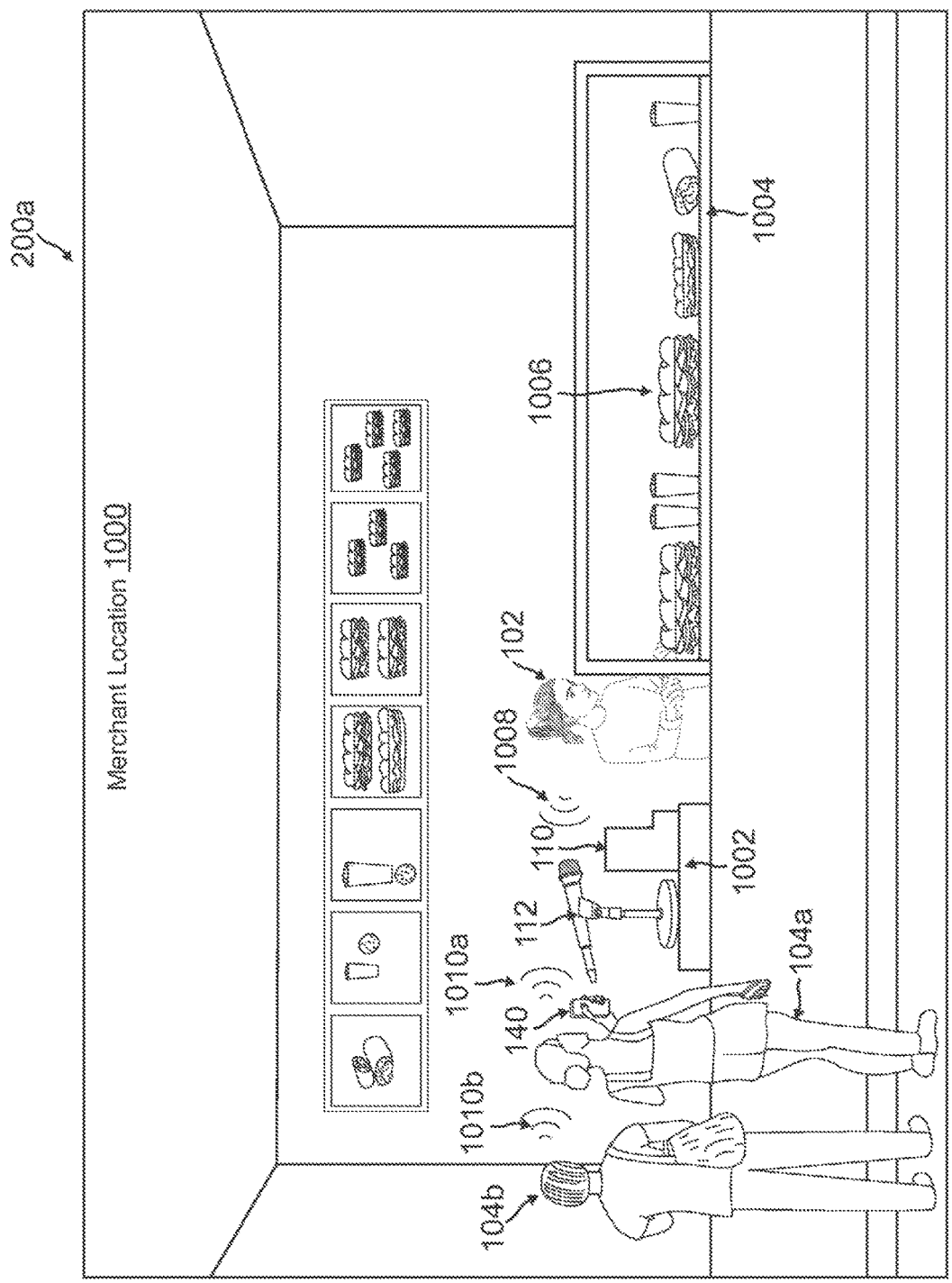
FIG. 2A is an exemplary environment having a voice data processor device to distinguish between multiple voice inputs at a merchant location, according to an embodiment.

FIG. 2A is an exemplary environment having a voice data processor device to distinguish between multiple voice inputs at a merchant location, according to an embodiment. Environment 200a includes merchant device 110 and a communication device 140 corresponding generally to the described features, processes, and components of merchant device 110 and communication device 140, respectively, in environment 100 of FIG. 1. In this regard, a merchant 102 utilizing merchant device 110 may utilize voice component 112 corresponding to those features and processes provided by voice component 112 of merchant device 110 in environment 100 of FIG. 1.

In environment 200a, a user 104a and a user 104b may visit a merchant location 1000 in order to purchase items from merchant 102. In this regard, merchant 102 may produce and/or provide one or more items for purchase, where the merchant would prefer to utilize hand-free transaction processing, for example, to meet sanitary requirements, expedite checkout, or other requirement or reason. Thus, on arrival of user 104*a* at a checkout location 1002, user 104*a* may order an item or otherwise request merchant 102 to produce an item (e.g., food or other item requiring merchant 102 to utilize their hands and/or meet sanitary or other mandated requirements). Merchant 102 may utilize preparation station 1004 to produce and/or provide one or more of items 1006. During and/or after preparation and/or provision of one or more of items 1006 to user 104*a*, merchant 102 may provide merchant voice input 1008. Merchant voice input 1008 may be detected by voice component 112, which may provide the merchant voice input to one or more applications of merchant device 110 for processing and determination of merchant input and other transaction data for entry to a transaction. Thus, merchant device 110 may generate a transaction based on the merchant voice input.

Additionally, after merchant voice input causes generation of a transaction on merchant device 110, merchant device may output an audio request or statement to user 104*a* that requests user 104*a* to provide information necessary for transaction processing (e.g., confirmation of the transaction, added items/tip, and/or entry of a payment instrument). Thus, user 104*a* may provide user voice input 1010*a* back to voice component 112. In various embodiments, user 104*b* may also be located at merchant location 1000 and perform or provide user voice data 1010*b*. However, voice component 112 and/or merchant device 110 may separate user voice data 1010*a* from user voice data 1010*b* based on voice data processing and/or parameters for user voice data 1010*a* and user voice data 1010*b*. Additionally, user 104*a* and user 104*b* may be prevented from entering user voice inputs 1010*a* and 1010*b* to merchant device 110 during merchant voice input 1008 based on a directional microphone of voice component 112. Once user voice data 1010*a* is detected, it may be provided to merchant device 110 for determination of user input to the transaction on merchant device 110 and processing of the transaction.

Figure 2B:
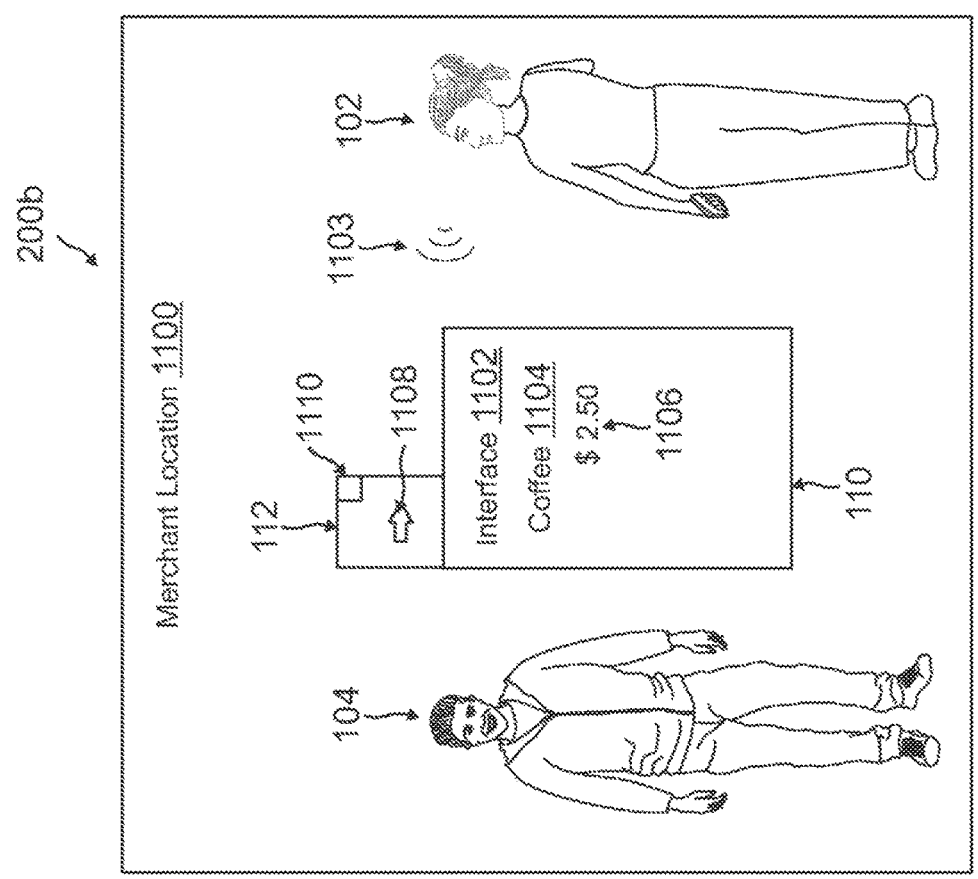
FIG. 2B is an exemplary environment displaying an interface of a merchant device receiving transaction processing information from multiple voice inputs, according to an embodiment.

FIG. 2B is an exemplary environment displaying an interface of a merchant device receiving transaction processing information from multiple voice inputs, according to an embodiment. Environment 200*b* includes merchant device 110 corresponding generally to the described features, processes, and components of merchant device 110 in environment 100 of FIG. 1. In this regard, a merchant 102 utilizing merchant device 110 may view an interface 1102 on merchant device 110, where interface 1102 provides capturing on data for posting to an online resource, for example, those features and processes provided by sales application 130 in environment 100 of FIG. 1.

A merchant location 1100 in environment 200*b* may include merchant 102 and user 104 described in reference to merchant 102 and users 104*a* and 104*b* in environment 200*a* of FIG. 2A. Thus, user 104 may be checking out with merchant 102 for one or more items purchased at merchant location 1100. In this regard, merchant device 110 may generate a transaction on interface 1102 based on merchant voice input 1103 spoken by merchant 102 while performing checkout for user 104. For example, interface 1102 may display items entered to a transaction and a cost for the transaction, shown as coffee 1104 with a total 1106 of $2.50. Thus, merchant 102 and/or user 104 may view interface 1102 to confirm transaction details and information entered through merchant voice input 1103. Additionally, merchant 102 and user 104 may also view a display component of voice component 112 that informs merchant 102 and user 104 of a direction for receipt of voice data. Thus, indicator 1108 points at merchant 102 to indicate that a directional microphone 1110 is sensitive to voice data in a direction for merchant 102.

Figure 3:
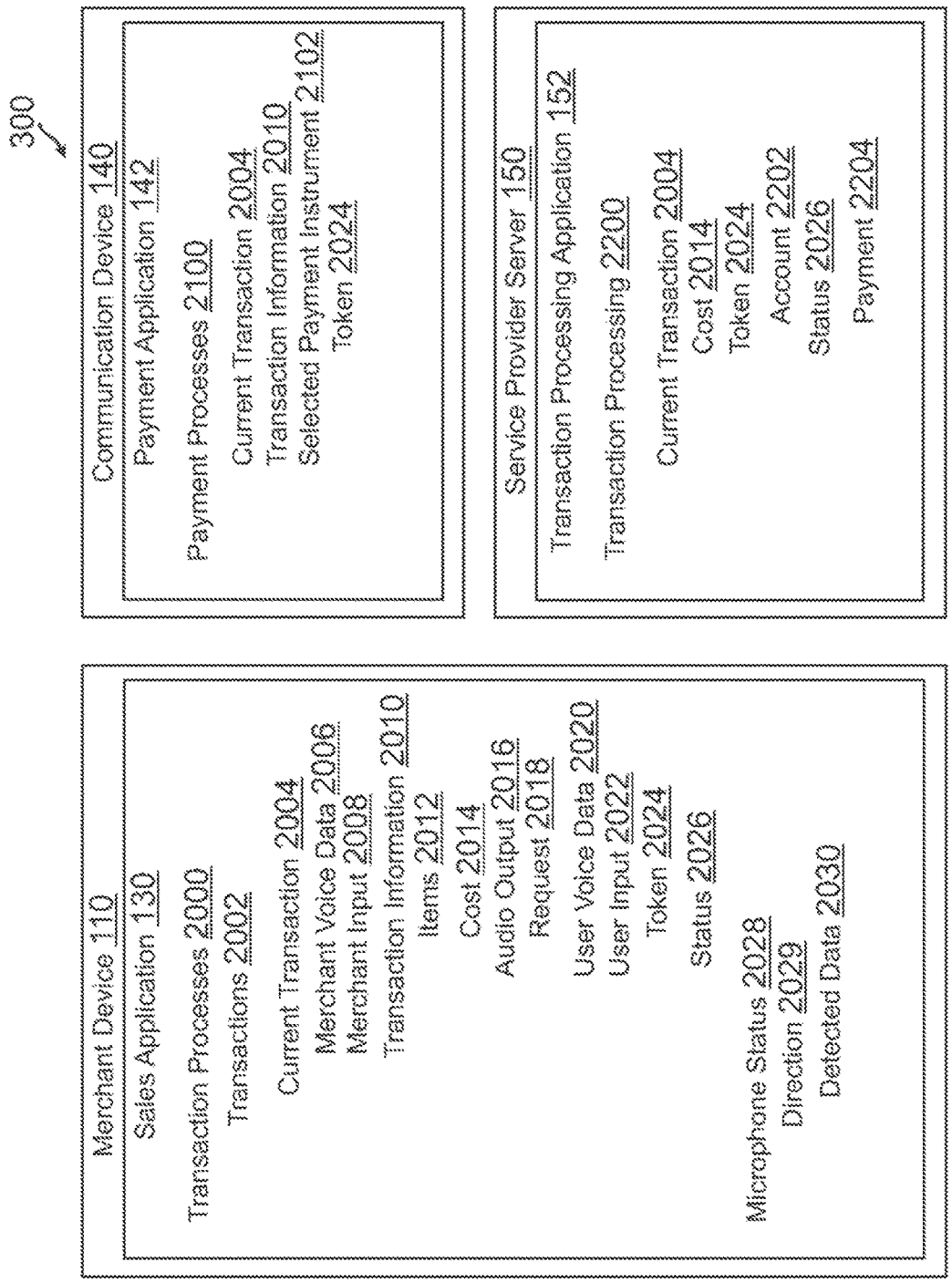
FIG. 3 is an exemplary system environment showing a merchant device receiving multiple voice data inputs and interacting with a communication device and a service provider for transaction processing, according to an embodiment.

FIG. 3 is an exemplary system environment 300 showing a merchant device receiving multiple voice data inputs and interacting with a communication device and a service provider for transaction processing, according to an embodiment. FIG. 3 includes merchant device 110, a communication device 140, and service provider server 150 all discussed in reference to environment 100 of FIG. 1.

Merchant device 110 executes sales application 130 corresponding generally to the specialized hardware and/or software modules and processes described in reference to FIG. 1. In this regard, sales application 130 may execute a process to generate a transaction and process the transaction based on information received from communication device 140 using service provider server 150. Thus, sales application 130 includes transaction processes 2000, which may be used to process transactions 2002. Transactions 2002 include a current transaction 2004 between the merchant associated with merchant device 110 and the user associated with communication device 140. Current transaction 2004 may be generated using merchant voice data 2006, which may be processed to determine merchant input 2008. Merchant input 2008 may include transaction information 2010, for example, items 2012 purchased in current transaction 2004 and a cost 2014 of current transaction 2004.

Sales application 130 may provide audio output 2016 to the user associated with communication device 140, which may include request 2018 to provide a payment instrument and/or confirm transaction processing. In response to request 2018, sales application may receive user voice data 2020, which may include user input 2022. Sales application 130 may receive a token 2024, where user input 2022 may confirm transaction processing using token 2022 based on request 2018. Once user input 2022 for transaction processing using token 2024 is received, a status 2026 may be determine for current transaction 2004. Sales application 130 may also utilize and/or process a microphone status 2028 to receive merchant voice data 2006 and user voice data 2020, for example, by determining a direction 2029 and detected data 2030.

Communication device 130 executes payment application 142 corresponding generally to the specialized hardware and/or software modules and processes described in reference to FIG. 1. In this regard, payment application 142 may provide a token to merchant device 110 for transaction processing and view results of transaction processing. For example, payment application 142 includes payment processes 2100. Payment processes 2100 may include data for current transaction 2004 having transaction information 2010. In response to current transaction 2004, the user of communication device 140 may enter a selected payment instrument 2102, such as token 2024, for communication device merchant device 110 for processing.

Service provider server 150 executes transaction processing application 152 corresponding generally to the specialized hardware and/or software modules and processes described in reference to FIG. 1. In this regard, transaction processing application 152 may process a received transaction from sales application 130 to provide a payment to the merchant associated with merchant device 110 from the user associated with communication device 140. Thus, transaction processing application 152 includes processes for transaction processing 2200, which may be executed using data for current transaction 20004. For example, transaction processing 2200 may utilize information for cost 2014 to process token 2024 identifying account 2202 to provide a payment to the merchant. Thus, current transaction 2004 may be associated with a status 2026 from the processing, such as a payment 2204 made to the merchant.

Figure 4:
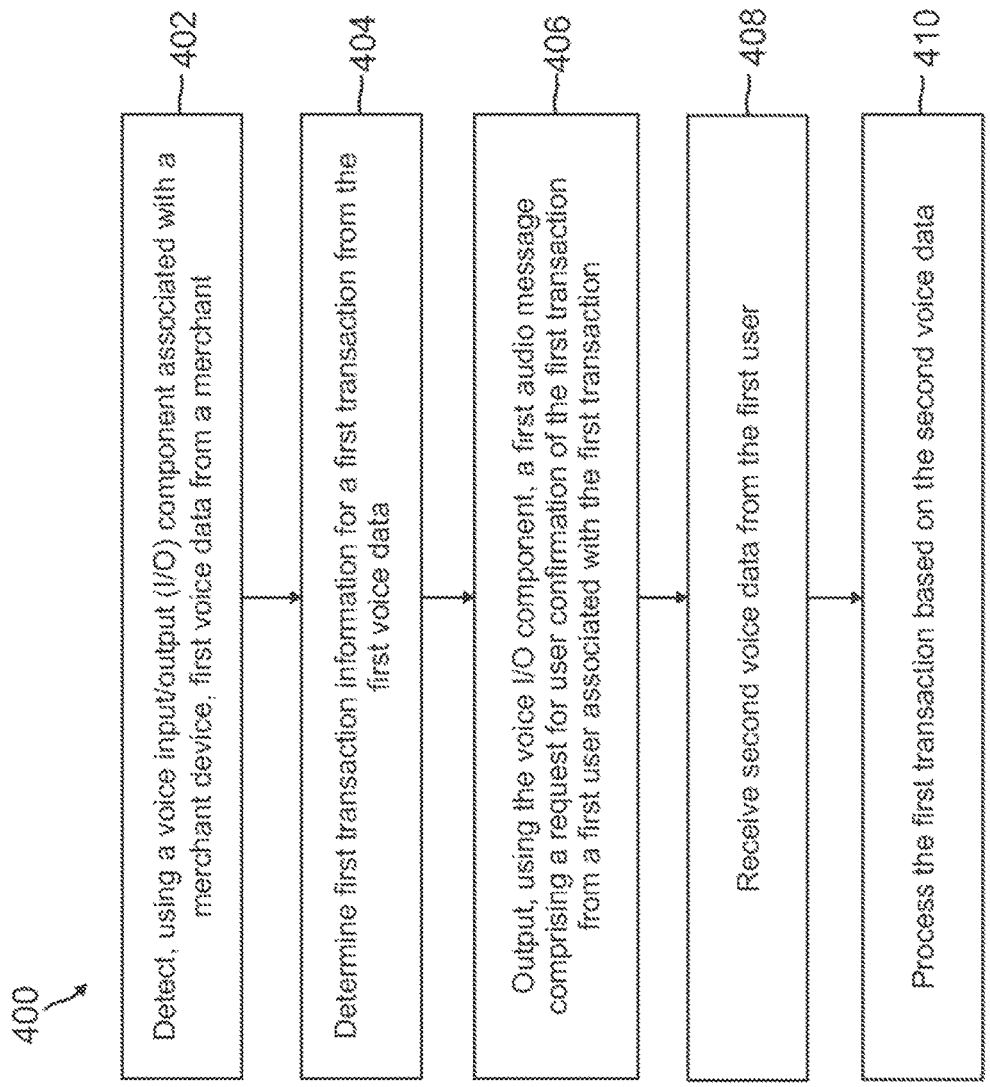
FIG. 4 is a flowchart of an exemplary process for a voice data processor for distinguishing multiple voice inputs, according to an embodiment.

FIG. 4 is a flowchart of an exemplary process for a voice data processor for distinguishing multiple voice inputs, according to an embodiment. Note that one or more steps, processes, and methods described herein may be omitted, performed in a different sequence, or combined as desired or appropriate.

At step 402, first voice data from a merchant is detected using a voice input/output (I/O) component associated with a merchant device for the merchant. Detecting the merchant's first voice input may comprise determining that the merchant voice input is performed by the merchant using a direction of receipt of the merchant voice input. Thus, voice input from a user may be received in a different direction. In other embodiments, the merchant's first voice input may be received prior to user voice input from the user, so that the merchant's first voice input initiates a sales application executing on the merchant's device to perform transaction processing. The merchant's first voice input may also be determined to correspond to the merchant using voice recognition of the merchant through past merchant voice data. At step 404, first transaction information for a first transaction is determined from the first voice data.

An audio message comprising a request for user confirmation of the first transaction from a first user associated with the first transaction is output using the voice I/O component, at step 406. The audio message may comprise a cost of the transaction. The first user may also be identified in the audio message, where the audio message requests confirmation of transaction processing for the transaction from the first user. Second voice data from the first user is received, at step 408. In various embodiments, first user input for the transaction is determined from the first user voice input. Moreover, second user voice input from a second user may be received, where the first user voice input and the second user voice input is distinguished and entry of second user input corresponding to the second user voice input is prevented from entry into the transaction. Distinguishing between the first user voice input and the second user voice input may use at least one of a first direction of entry of the first user voice input, a second direction of entry of the second user voice input, a third direction of audio sensitivity for a directional microphone of the voice I/O component, a decibel level of the first user voice input or the second user voice input, the first user input, the second user input, or voice recognition. The merchant device may further comprise a display component comprising a directional indicator, wherein the directional indicator indicates a first direction associated with the merchant for the detecting the merchant's first voice input and a second direction associated with the first user during the requesting the user's second voice input. Additionally, the voice I/O component may further comprise a directional microphone, wherein the directional microphone activates in the first direction during the detecting the merchant's first voice input, and wherein the directional microphone activates in the second direction during the requesting the user's second voice input.

At step 410, the first transaction is processed based on the second voice data. In various embodiments, the second voice data and/or the audio message may identify a payment instrument for use in the processing the transaction, wherein the payment instrument comprises an account of the first user with a payment provider. Thus, the merchant device may request transaction processing from the payment provider using the account of the first user and receive confirmation of a payment from the account to the merchant for the transaction. The account with the payment provider may be identified using a token received from a communication device of the first user, where the token is received from the communication through one of a check-in by the user at a merchant location for the merchant or short range wireless communications between the communication device and the computing device system. Additionally, the token may be associated with the first user using one of a name of the first user with the token or short range wireless communications providing the token from the communication device to the computing device system. In other embodiments, the token may be requested from the communication device.

A second transaction with a second user may also be determined after the transaction with the first user, where further voice input by the first user during transaction processing of the second transaction is prevented. Additionally, third voice data from the merchant may be detected, where the second transaction is determined using the third voice data, and the first user is prevented from entering further voice input based on voice recognition of the first user.

Figure 5:
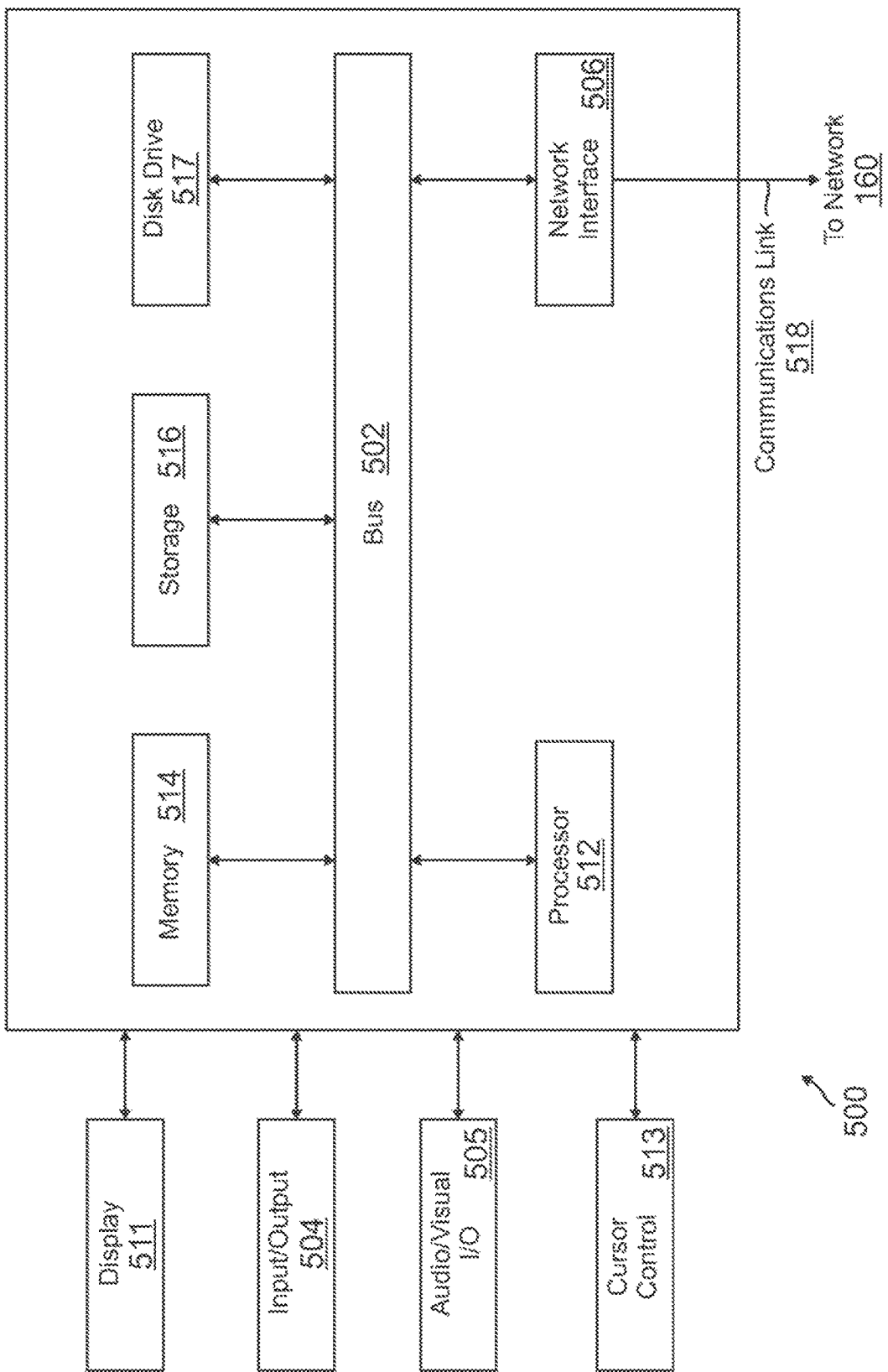
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517.

Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computing device system comprising:
    a non-transitory memory;
    a voice input/output (I/O) component comprising a set of directional microphones that detects voice input from a plurality of users; and
    one or more hardware processors coupled to the non-transitory memory and configured to read instructions from the non-transitory memory to cause the computing device system to perform operations comprising:
    detecting, by the voice I/O component, a first voice input and a first direction of the first voice input using the set of directional microphones;
    identifying the first voice input as being provided by a merchant based on the detected first direction of the first voice input;
    determining, based on identifying the first voice input as being provided by the merchant, a merchant input, wherein the merchant input comprises a request to initiate a transaction;
    initiating the transaction based on the determined merchant input;
    detecting, by the voice 1/O component, a second voice input from a customer user, using the set of directional microphones, wherein the second voice input is received from a second direction different from the first direction;
    determining a consumer input for the transaction from the second voice input; populating the transaction with data based on the determined consumer input; and
    executing, using a transaction processing component, the populated transaction using payment information provided by the customer user.

2. The computing device system of claim 1, wherein executing the populated transaction comprises:
    providing the populated transaction to the transaction processing component on the computing device system for execution; and
    receiving, using an interface of the computing device system, payment information for a payment instrument.

3. The computing device system of claim 1, wherein the first voice input is identified as being provided by the merchant further based on voice recognition of the first voice input as being associated with the merchant.

4. The computing device system of claim 1, wherein the customer user is a first customer user and the consumer input is a first consumer input, the operations further comprising:
    detecting, by the voice I/O component, a third voice input;
    associating the third voice input with a second customer user by distinguishing between the second input and the third voice input; and
    preventing entry of a second consumer input corresponding to the third voice input into the transaction based on the associating of the third voice input with the second customer user.

5. The computing device system of claim 4, wherein the second voice input is distinguished from the third voice input based on a detection of a third direction of the third voice input being different from the second direction of the second voice input.

6. The computing device system of claim 4, wherein the second voice input is distinguished from the third voice input based on detecting a first decibel level of the second voice input and detecting a second decibel level of the third voice input, wherein the first decibel level is different from the second decibel level.

7. The computing device system of claim 1, wherein the operations further comprise:
   requesting, using the voice I/O component in response to detecting the first voice input, the second voice input from the customer user, wherein the requesting the second voice input comprises requesting a payment instrument for use in processing the transaction; and
   receiving, by the voice I/O component from the customer user, an indication of the payment instrument to be used in a processing of the transaction.

8. A method for executing a transaction, the method comprising:
   detecting, using a voice I/O component comprising a set of directional microphones, a first voice input and a first direction of the first voice input using the set of directional microphones;
   identifying the first voice input as being provided by a merchant based on the detected first direction of the first voice input;
   determining, based on identifying the first voice input as being provided by the merchant, a merchant input, wherein the merchant input comprises a request to initiate the transaction;
   initiating the transaction based on the determined merchant input;
   detecting, using the voice I/O component, a second voice input from a customer user, using the set of directional microphones, wherein the second voice input is received from a second direction different from the first direction;
   determining a consumer input for the transaction from the second voice input;
   populating the transaction with data based on the determined consumer input; and
   executing, using a transaction processing component, the populated transaction using payment information provided by the customer user.

9. The method of claim 8, wherein executing the populated transaction comprises:
   providing the populated transaction to the transaction processing component for execution; and
   receiving payment information for a payment instrument.

10. The method of claim 8, wherein the first voice input is identified as being provided by the merchant further based on voice recognition of the first voice input as being associated with the merchant.

11. The method of claim 8, wherein the customer user is a first customer user and the consumer input is a first consumer input, the method further comprising:
   detecting, by the voice I/O component, a third voice input;
   associating the third voice input with a second customer user by distinguishing between the second voice input and the third voice input; and
   preventing entry of a second consumer input corresponding to the third voice input into the transaction based on the association of the third voice input with the second customer user.

12. The method of claim 11, wherein the second voice input is distinguished from the third voice input based on a detection of a third direction of the third voice input being different from the second direction of the second voice input.

13. The method of claim 11, wherein the second voice input is distinguished from the third voice input based on detecting a first decibel level of the second voice input and detecting a second decibel level of the third voice input, wherein the first decibel level is different from the second decibel level.

14. The method of claim 8, further comprising:
   requesting, using the voice I/O component in response to detecting the first voice input, the second voice input from the customer user, wherein the requesting the second voice input comprises requesting a payment instrument for use in processing the transaction; and
   receiving, by the voice I/O component from the customer user, an indication of the payment instrument to be used in a processing of the transaction.

15. A non-transitory machine-readable medium having stored thereon machine-readable instructions executable to cause performance of operations comprising:
   detecting, by a voice I/O component comprising a set of directional microphones, a first voice input and a first direction of the first voice input using the set of directional microphones;
   identifying the first voice input as being provided by a merchant based on the detected first direction of the first voice input;
   determining, based on identifying the first voice input as being provided by the merchant, a merchant input, wherein the merchant input comprises a request to initiate a transaction;
   initiating the transaction based on the determined merchant input;
   detecting, by the voice I/O component, a second voice input from a customer user, using the set of directional microphones, wherein the second voice input is received from a second direction different from the first direction;
   determining a consumer input for the transaction from the second voice input;
   populating the transaction with data based on the determined consumer input; and
   executing, using a transaction processing component, the populated transaction using payment information provided by the customer user.

16. The non-transitory machine-readable medium of claim 15, wherein the executing the populated transaction comprises:
   providing the populated transaction to the transaction processing component for execution; and
   receiving, using an interface of the transaction processing component, payment information for a payment instrument.

17. The non-transitory machine-readable medium of claim 15, wherein the first voice input is identified as being provided by the merchant further based on voice recognition of the first voice input as being associated with the merchant.

18. The non-transitory machine-readable medium of claim 15, wherein the customer user is a first customer user and the consumer input is a first consumer input, the operations further comprising:
   detecting, by the voice I/O component, a third voice input;
   associating the third voice input with a second customer user by distinguishing between the second voice input and the third voice input; and
   preventing entry of a second consumer input corresponding to the third voice input into the transaction based on the association of the third voice input with the second customer user.

19. The non-transitory machine-readable medium of claim 18, wherein the second voice input is distinguished from the third voice input based on a detection of a third direction of the third voice input being different from the second direction of the second voice input.

20. The non-transitory machine-readable medium of claim 18, wherein the second voice input is distinguished from the third voice input based on detecting a first decibel level of the second voice input and detecting a second decibel level of the third voice input, wherein the first decibel level is different from the second decibel level.

\* \* \* \* \*

UNITED STATES PATENT AND TRADEMARK OFFICE
CERTIFICATE OF CORRECTION

PATENT NO. : 10,467,616 B2
APPLICATION NO. : 15/944144
DATED : November 5, 2019
INVENTOR(S) : Ryan Christopher May, Josh Beyers and Vidit Maniyar Page 1 of 1

It is certified that error appears in the above-identified patent and that said Letters Patent is hereby corrected as shown below:

In the Claims

In Column 24, Line 27, change "1/O" to --I/O--

Signed and Sealed this
Seventh Day of April, 2020

Andrei Iancu
*Director of the United States Patent and Trademark Office*